United States Patent
Mansfield

[15] 3,652,928
[45] Mar. 28, 1972

[54] METHOD AND APPARATUS FOR TESTING ELECTRICAL DETECTION SYSTEMS

[72] Inventor: John William Brian Mansfield, 144 A Commercial Way, London S.E. 15, England

[22] Filed: July 7, 1969

[21] Appl. No.: 839,507

[30] Foreign Application Priority Data

July 10, 1968 Great Britain......................32,917/68

[52] U.S. Cl. ..............................324/34 R, 324/41, 340/410
[51] Int. Cl.......................................................G01r 35/00
[58] Field of Search ................324/41, 37, 34; 340/409, 214, 340/410, 411

[56] References Cited

UNITED STATES PATENTS

| | | | |
|---|---|---|---|
| 3,319,160 | 5/1967 | Wood et al. | 324/37 |
| 2,942,178 | 6/1960 | Nerwin | 324/34 |
| 3,408,493 | 10/1968 | Westover et al. | 324/41 |

Primary Examiner—Rudolph V. Rolinec
Assistant Examiner—R. J. Corcoran
Attorney—Holcombe, Wetherill & Brisebois

[57] ABSTRACT

A method of testing a detection system having inductively coupled primary and secondary coils with a switching device connected to the output. An impedance is switched into the secondary coil circuit to cause a change in output which is insufficient to actuate the switching means and an alarm senses any absence of change in output, indicating that there is a fault in the detection system.

15 Claims, 1 Drawing Figure

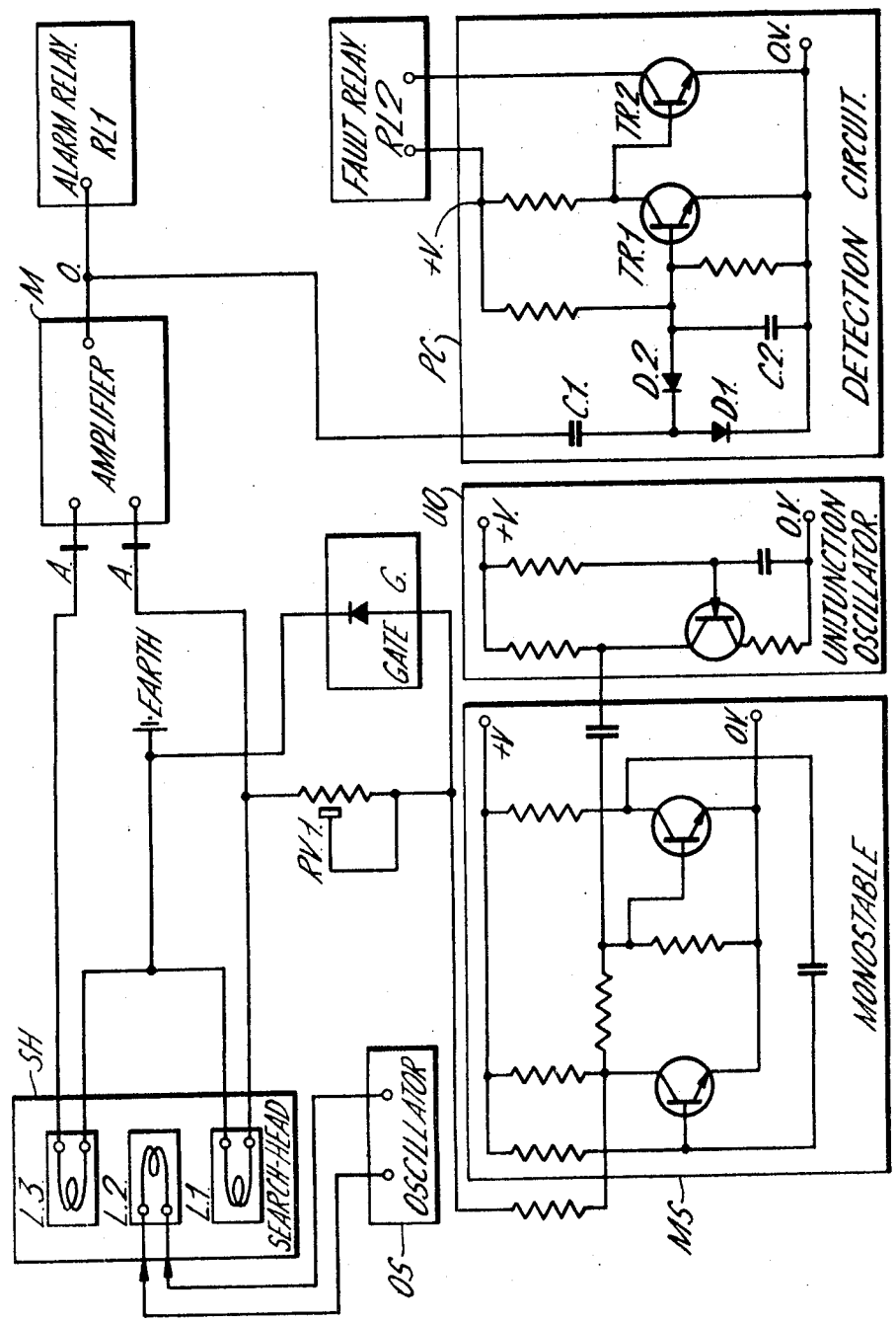

METHOD AND APPARATUS FOR TESTING ELECTRICAL DETECTION SYSTEMS

The invention relates to a method of, and a device for, testing an electrical system in which at least one primary coil is coupled inductively to at least one secondary coil. A particularly useful application of the invention is to provide self-testing arrangements in materials detectors, for example metal detectors.

According to a first aspect thereof, the present invention provides a method of testing an electrical system in which at least one primary coil is coupled inductively to at least one secondary coil, the primary coil is arranged to be energized by an alternating current to produce an electromagnetic field, and a disturbance in the pattern of the electromagnetic field is effective to produce a change in the output of the secondary coil or coils, which change in output is effective to operate a switching means; said method comprising the steps of connecting an impedance to one of the coils to cause said change in output of the secondary coil or coils, the impedance being connected into circuit for such periods that the change in output of the secondary coil or coils is not effective to operate said switching means, and sensing the absence of any change in the output of the secondary coil or coils when the impedance is connected into circuit.

According to a second aspect thereof, the present invention provides a device for testing an electrical system in which at least one primary coil is coupled inductively to at least one secondary coil, the primary coil being arranged to be energized by an alternating current to produce an electromagnetic field, and a disturbance in the pattern of the electromagnetic field is effective to produce a change in the output of the secondary coil or coils, which change in output is effective to operate a switching means; said device comprising an impedance which can be connected to one of the coils to cause said change in output of the secondary coil or coils, means for connecting the impedance into circuit for such short periods that the change in output of the secondary coil or coils is not effective to operate said switching means, and an indicating means which indicates the absence of any change in the output of the secondary coil or coils when the impedance is switched into circuit.

In said system, the disturbance of the field may be caused by the presence of a material, for example metallic material, in the field. In a preferred arrangement, the system may have two said secondary coils which are normally in balance so as to have no net output when the primary coil is energized, and said disturbance of the field causes a net output from the secondary coils.

According to a third aspect thereof, the present invention provides a materials detector particularly for detecting metals, comprising a search-head which has a primary coil coupled inductively to two secondary coils, the primary coil being arranged to be energized by alternating current to produce an electromagnetic field, and the two secondary coils being connected in phase opposition so as to produce no net output in the absence of any material to be detected, the presence of the material being effective to disturb the electromagnetic field so as to produce a net output voltage from the secondary coils, which output voltage is effective to operate an alarm switching means, characterized in that the detector further comprises an impedance which can be connected to one of the secondary coils to cause a net output to be produced from the secondary coils without the presence of any material to be detected, means for switching the impedance into circuit for such short periods that the net outputs from the secondary coils is not effective to operate the alarm switching means, and a fault indicating means which indicates the absence of any net output from the secondary coils when the impedance is switched into circuit.

Conveniently, the impedance is a resistor which may be adjustable. The means for switching the impedance into, or out of, circuit may comprise a diode gate operated by a unijunction oscillator through a monostable circuit. The alternating current may be supplied to the primary coil by an oscillator.

Preferably, an amplifier is provided for amplifying any net output voltage from the secondary coils.

The alarm switching means and the fault indicating means may each comprise a relay, the alarm relay being operated by the presence of the appropriate signal, and the fault relay being operated by the absence of the appropriate signal. The fault indicating means may further comprise a pulse counting circuit, and the arrangement may be such that the pulse counting circuit holds the fault relay in the unoperated position when the net output signals are received from the secondary coils but operates the fault relay when no net output signals are received from the secondary coils, with the impedance switched into circuit.

The primary coil and the secondary coils may be arranged to form a differential transformer through which the metallic material may pass.

A specific embodiment of the invention will now be described, by way of example, with reference to the accompanying diagrammatic drawing.

Referring to the drawing, a metal detector comprises a primary coil L2 and is coupled inductively to two secondary coils L1 and L3, with the coils L1 and L3 connected in phase opposition, to form a differential transformer. One terminal of each of coils L1 and L3 is earthed, while the other terminal of the coils L1 and L3 are connected at A, A to provide the inputs to an amplifier M. The coils L1, L2 and L3 are in axial alignment and are disposed in a search-head SH. An oscillator OS feeds alternating current to the coil L2. The output of the amplifier M is connected to an alarm relay RL1.

In operation, when no metallic material is passing through the search-head SH the coils L1 and L3 are balanced to produce zero output at A, A with the coil L2 being fed from the oscillator OS. When metallic material is passing through the search-head SH, the balance of the coils L1 and L3 to the coil L2 is disturbed, and an output voltage proportional to this unbalance appears at A,A. This output is amplified by the amplifier M and is effective to operate the relay RL1.

In practice it is necessary to test the metal detector from time to time to ascertain that it is functioning correctly and that its ability ro detect a given mass of metal has not deteriorated. A known, generally used, method of doing this testing is to pass a test piece containing, or made of, metallic material through the search-head. Proper functioning of the relay RL1 as a result of the passing of the test-piece would indicate that the detector is in suitable working order. The present invention is directed to providing a more convenient means for testing the detector, as described below.

An adjustable resistor RV1 is connected in shunt with the coil L1, and a diode gate G is effective to switch the resistor RV1 into, and out of, circuit. When the resistor RV1 is in circuit it disturbs the balance of the coils L1 and L3 in a manner similar to the passing of metallic material through the search-head SH, so that a voltage output appears at A,A and is amplified by the amplifier M. The amplitude of the voltage at A,A is dependent upon the value of the resistor RV1.

The switching pulses for the gate G are generated by a monostable circuit MS and a unijunction oscillator UO. The monostable circuit MS provides pulses of given duration (i.e., the test periods and the unijunction oscillator UO provides the drive for the monostable circuit MS (i.e., the number of tests per second). A detection circuit PC is connected at O to the output of the amplifier M. The circuit PC is effective to control the operation of a fault relay RL2, and comprises transistors TR1 and TR2, diodes D1 and D2, and capacitors C1 and C2.

In operation, the periods for which the resistor RV1 is switched into circuit are too short to operate the alarm relay RL1, but are sufficient to provide pulses at O for detection by the circuit PC.

In the detection circuit PC, with the test pulses appearing at O, a negative bias is produced on the base of the transistor TR1, so that the transistor TR1 is held in a cutoff state. When the transistor TR1 is cutoff, the transistor TR2 is bottomed (i.e., rendered fully conductive), so that the relay RL2 is held closed. Should the test pulses fail to reach the circuit PC, for example due to failure of any part of the detector, the negative bias on the base of the transistor TR1 will cease, so that the transistor TR1 will bottom and cut off the transistor TR2. This will result in the opening of the relay RL2, thereby indicating a fault in the detector.

Various modifications, known in the relevant art, may be made in the metal detector. Thus, the alarm relay RL1 may be replaced by other switching means for operating apparatus (e.g., conveyor or sorting apparatus) associated with the detector. The fault relay RL2 may be replaced by other indicating means. The search-head SH may have various other parts known in the metal detector art, and may be in the form of a probe.

The invention may be applied to various other known types of metal detectors and to various other known electrical systems.

I claim:

1. A method of testing an electrical detection system in which primary coil means is inductively coupled to secondary coil means by an electromagnetic field when the primary coil means is supplied with a source of alternating current, and in which the secondary coil means is operatively connected to switching means so that the switching means operates upon a change in output from the secondary coil means caused by a disturbance of the electromagnetic field provided such change has at least a predetermined magnitude, said method including the steps of:
    periodically connecting an impedance in circuit with said secondary coil means to cause changes of the output of the secondary coil means that are of at least said predetermined magnitude but that persist only for periods so short that the switching means is not operated, and
    using sensing means to detect when there are no changes in the output consequent to the impedance being periodically connected in circuit.

2. A device for testing an electrical circuit in which primary coil means is inductively connected to secondary coil means by an electromagnetic field when the primary coil means is supplied with power from a source of alternating current, and in which the secondary coil means is operatively connected to switching means so that the switching means operates upon a change in output from the secondary coil means caused by a disturbance in the electromagnetic field, provided such change has at least a predetermined magnitude, the device comprising an impedance which when connected in circuit with said secondary coil means causes a change of at least said predetermined magnitude in the output from said secondary coil means, means for periodically connecting the impedance in circuit with said secondary coil means only for periods of such short duration that the resulting changes in output of the secondary coil means persist for too short a time to operate the switching means, and sensing means responsive to the output of said secondary coil means for producing a signal when said periodic connection of said impedance in said transformer circuit fails to produce a corresponding change in the output of said secondary coil means.

3. A device according to claim 2, wherein the impedance is a variable resistor.

4. A device according to claim 2, wherein the connecting means includes a gating device connected in series with the secondary coil means, and a monostable circuit connected to drive said gating device.

5. A device according to claim 2, wherein the sensing means includes a pulse responsive detection circuit connected to receive the output of the secondary coil means and a relay, said pulse responsive detection circuit being adapted to hold the relay off while periodic changes occur in output caused by connecting the impedance in circuit, and adapted to operate the relay if such periodic changes do not occur.

6. A device according to claim 2, wherein the connecting means includes a gating device connected in series with the secondary coil means, and a monostable circuit connected to drive said gating device and the sensing means includes a pulse responsive detection circuit connected to receive the output of the secondary coil means and relay, said pulse responsive detection circuit being adapted to hold the relay off while periodic changes occur in output caused by connecting the impedance in circuit, and adapted to operate the relay if such changes do not occur.

7. An electrical detection system, particularly detecting metals, in combination with a testing device for the system, said electrical detection system comprising primary coil means, secondary coil means inductively coupled to the primary coil means by an electromagnetic field when the primary coil means is supplied from a source of alternating current, switching means so connected to said secondary coil means as to be operated upon a change in output from said secondary coil means as a result of disturbance in said electromagnetic field, provided such change has at least a predetermined magnitude, and said testing device comprising an impedance which can be coupled in circuit with the secondary coil means to cause a change in output from the secondary coil means of at least said predetermined magnitude, means operable for periodically connecting the impedance in circuit only for periods of such short duration that the resulting changes in output of the secondary coil means persist for too short a time to operate the switching means, and sensing means responsive to the output of the secondary coil means operatively connected to produce a signal when said periodic connection of said impedance in said transformer circuit fails to produce a corresponding change in the output of said secondary coil means.

8. A system according to claim 7, wherein the secondary coil means comprises two coils connected in phase opposition so that no output is produced in the absence of any material to be detected, and the impedance means not connected in circuit.

9. A system according to claim 7, wherein the primary coil means is a single coil and the primary and secondary coil means are arranged to form a differential transformer.

10. A system according to claim 7, wherein the primary and secondary coil means are arranged so that a rod of the material to be detected can pass through both coil means.

11. A system according to claim 7, wherein the primary coil means is connected to a supply oscillator.

12. A system according to claim 7, wherein the secondary coil means is connected to the switching means through an amplifier.

13. A system according to claim 12, wherein the sensing means is coupled to the output of the amplifier and comprises a detection circuit and a relay, said detection circuit being adapted to hold the relay off while periodic changes occur in the output of the secondary coil means caused by connecting the impedance in circuit, and adapted to operate the relay if such periodic changes do not occur.

14. A system according to claim 7, wherein the connecting circuit includes a gating means connected in series with the secondary coil means and operated by a monostable circuit supplied by a unijunction oscillator.

15. A system according to claim 7, wherein the primary and secondary coil means are contained in a search-head which is in the form of a probe.

* * * * *

UNITED STATES PATENT OFFICE
CERTIFICATE OF CORRECTION

Patent No. 3,652,928          Dated March 28, 1972

Inventor(s) JOHN WILLIAM BRIAN MANSFIELD

It is certified that error appears in the above-identified patent and that said Letters Patent are hereby corrected as shown below:

[73] Assignee:  The Rank Organisation Limited,
                London, England

Signed and sealed this 24th day of October 1972.

(SEAL)
Attest:

EDWARD M. FLETCHER, JR.                ROBERT GOTTSCHALK
Attesting Officer                      Commissioner of Patents